United States Patent Office 3,075,876
Patented Jan. 29, 1963

3,075,876
ALIMENTARY COMPOSITION FOR COMBATTING ENTERIC INFECTION IN MONKEYS AND METHOD OF USING SAME
John F. Stark and Russell Y. Mosher, Norwich, N.Y., assignors to The Norwich Pharmacal Company, a corporation of New York
No Drawing. Filed June 7, 1961, Ser. No. 115,333
5 Claims. (Cl. 167—53)

This invention relates to animal management and aims to provide a therapeutic alimentary composition and a method of combatting enteric infections. More particularly, this invention is concerned with an aqueous therapeutic alimentary composition and its ingestion to control enteric infections in monkeys.

The monkey, especially the rhesus monkey, is a very valuable animal for research purposes. In the neighborhood of 350,000 monkeys are imported each year for such purposes. The use of these monkeys in controlled research studies demand that the animals be maintained in a satisfactory state of health. Care must be taken to guard against infection and to detect infected individuals upon receipt. Colony husbandry of monkeys requires utmost safeguards; for inadvertent oversight in detecting and treating infected animals can lead to sickness and even death of those animals which would otherwise be sufficiently healthy for research purposes. Either consequence is costly.

Enteric infection is the most frequently encountered disease in the rhesus monkey and accounts for greater loss than any other single factor. Lesions due to this infection are seen in about 70% of monkeys upon arrival and losses run as high as 30%. Shigella and Salmonella species are the chief offending organisms.

The control of enteric infection constitutes an ever present and continuing problem to those concerned with establishing and maintaining a monkey colony. The dynamic population of such a colony accentuates the problem. The administration of chemotherapeutic agents effective against enteric pathogens has met with some success in combatting the problem. In the use of such agents mass treatment of colony is highly desirable. Individual treatment by oral or parenteral administration of chemotherapeutics is costly in terms of labor and time and also incurs the risk of injury to animal and the handler. The use of the drinking water supply of the animals affords an effective and easy form of administration of chemotherapeutic agents for mass treatment. This form is especially suitable since sick animals tend to refuse feed but continue to drink.

Furazolidone is highly effective and often the agent of choice in the treatment of enteric infections such as shigellosis and salmonellosis in monkeys when administered in their diet. (Ann. N.Y. Acad. of Sc. 85: Art. 3; pp. 777–784, 1960.) This substance is N-(5-nitro-2-furfurylidene)-3-amino-2-oxazolidone (U.S. Patent No. 2,742,462). It is lowly and difficultly soluble in water. By shaking it in water for a period of 6–8 hours a solution containing about 40 mg./liter can be obtained. Such solubility precludes expeditious and extemporaneous use of aqueous solutions. Furthermore, its maximum solubility in water affords a concentration less than that deemed to be desirable in the optimal therapeutic management of enteric infection through the drinking water of monkeys.

Attempts to provide aqueous suspensions containing desirable concentrations of furazolidone and suitable as the drinking water supply of monkeys have not met with success. The ordinary use of gelling, dispersing, emulsifying and suspending agents to provide acceptable suspensions has failed due to settling out of furazolidone in a very short time period; refusal of the preparations by the monkeys; and exacerbation of the enteric infection as well as cumbersome and impractical procedures in their preparation.

It is an object of this invention to provide a dry, free-flowing, easily prepared composition containing furazolidone which can be readily admixed in the drinking water supply of monkeys. It is a further object of this invention to provide aqueous suspensions of furazolidone which are palatable and do not increase severity of disease. Another object of this invention is the provision of aqueous suspensions of furazolidone which are relatively stable and retain the active agent uniformly dispersed for a time period commensurate with monkey colony husbandry. Further objects will be apparent from the description of the invention given herein.

In accordance with the objects of this invention it has been discovered that a dry, free-flowing, mixture comprising furazolidone, Cab-O-Sil® (Godfrey L. Cabot, Inc.; Boston, Mass.) which is a colloidal silica, pectin and sugar can be very readily prepared and can be very simply admixed with water to provide palatable, therapeutic, non-foaming, non-exacerbating, sufficiently stable suspensions for use as the drinking water supply to combat enteric infections in monkeys.

In the practice of this invention the dry, free-flowing mixture comprising furazolidone, colloidal silica, pectin and sugar is prepared by bringing together the ingredients and intimately blending them by tumbling, grinding or stirring to assure uniformity. It has been found advantageous in order to secure best results upon subsequent admixture with water to prepare the mixture or concentrate by intimately combining one pair of the ingredients; furazolidone and colloidal silica, and, similarly, the other pair; pectin and sugar, and then to intimately mix the pairs by tumbling, grinding or stirring.

It is believed that the aqueous suspensions obtained in accordance with this invention are the result of a felicitous union, coaction and interdependency of the ingredients of the concentrate when produced, for instance, according to the advantageous embodiment described above which causes the colloidal silica particles to coat, the furazolidone aggregates thus preventing the latter from adhering to the pectin and interfering with its hydration; which, in turn, is hastened by initially placing it in intimate contact with the sugar.

The proportions of the ingredients of the concentrate can be varied. A formulation which has been found to be highly satisfactory is represented as follows:

*Formulation A*

| Ingredient: | Parts by weight |
|---|---|
| Furazolidone | 1.60 |
| Colloidal silica | 1.07 |
| Pectin | 144.00 |
| Sugar | 307.33 |

One pound of this concentrate admixed with four gallons of water provides a suspension containing about 0.01% of furazolidone, an amount sufficient to accomplish desirable therapeutic effect. Lesser or larger quantities of water can obviously be used to obtain suspensions containing correspondingly less or more furazolidone. For optimum therapeutic measures the concentration of furazolidone may be varied between about 0.005% and about 0.0375%. Lower concentrations are advantageously used in the prophylaxis of disease while higher levels are judiciously employed in the treatment of established infection.

Other representative concentrate formulations are:

Formulation B

| Ingredient: | Parts by weight |
|---|---|
| Furazolidone | 3.20 |
| Colloidal silica | 2.14 |
| Pectin | 184.00 |
| Sugar | 264.66 |

Formulation C

| Ingredient: | |
|---|---|
| Furazolidone | 6.0 |
| Colloidal silica | 4.0 |
| Pectin | 184.0 |
| Sugar | 260.0 |

The concentrate is easily converted into a stable aqueous suspension by adding water to it under agitation until uniform dispersion has been effected. It has been found advantageous to use warm water (60–70° C.) to hasten the preparation of the suspension. Cooler water may be used which lengthens the period during which stirring is required. The suspension is ready for dispensing when uniformity is obtained. The quantity of water used in preparing the suspensions will, of course, depend on the desired concentration of furazolidone (0.005%–0.0375%).

What is claimed is:

1. An alimentary composition for ad libitum administration to a monkey colony to combat enteric disease in monkeys which comprises an aqueous suspension containing furazolidone, colloidal silica, pectin and sugar; said furazolidone being present in the amount of from about 0.005 to about 0.0375% by weight.

2. The composition of claim 1 wherein the amount of furazolidone is 0.01%.

3. A concentrate adapted to be introduced into the drinking water supply of a monkey colony to provide an aqueous suspension containing from about 0.005 to about 0.0375% by weight of furazolidone for the purpose of combatting enteric infections in said colony comprising from 0.3–1.5 parts of furazolidone; from 0.2–0.9 part of colloidal silica; from 31–40 parts pectin; and from 58–67 parts of sugar for each 100 parts of said concentrate.

4. The concentrate of claim 3 wherein there are 0.36 part of furazolidone; 0.22 part of colloidal silica; 31.72 parts of pectin; and 67.70 parts of sugar.

5. In the method of combatting enteric infections in monkeys by individual oral or parenteral administration of chemotherapeutics, the improvement, which comprises ad libitum administration to a monkey colony of an aqueous suspension consisting essentially of furazolidone, colloidal silica, pectin and sugar; said furazolidone being present in an amount of from about 0.005 to about 0.0375% by weight.

References Cited in the file of this patent

UNITED STATES PATENTS 2,742,462    Gever _____ Apr. 17, 1956

OTHER REFERENCES

U.S. Dispensatory, 25th edition, 1955, Lippincott Co., pages 980, 1346 and 1848.